(12) United States Patent
Weinstein (10) Patent No.: US 8,644,971 B2
(45) Date of Patent: Feb. 4, 2014

(54) SYSTEM AND METHOD FOR PROVIDING MUSIC BASED ON A MOOD

(75) Inventor: Phil Weinstein, Burbank, CA (US)

(73) Assignee: Phil Weinstein, Burbank, CA (US)

( * ) Notice: Subject to any disclaimer, the term of this patent is extended or adjusted under 35 U.S.C. 154(b) by 414 days.

(21) Appl. No.: 12/927,145

(22) Filed: Nov. 8, 2010

(65) Prior Publication Data

US 2011/0112671 A1    May 12, 2011

Related U.S. Application Data

(60) Provisional application No. 61/280,736, filed on Nov. 9, 2009.

(51) Int. Cl.
*G06F 17/00* (2006.01)
(52) U.S. Cl.
USPC .......................................................... 700/94
(58) Field of Classification Search
USPC .......................................................... 700/94
See application file for complete search history.

(56) References Cited

U.S. PATENT DOCUMENTS

| | | | |
|---|---|---|---|
| 6,353,173 B1 * | 3/2002 | D'Amato et al. | 84/609 |
| 6,460,018 B1 * | 10/2002 | Kasai et al. | 705/7.21 |
| 2006/0194181 A1 * | 8/2006 | Rosenberg | 434/317 |
| 2007/0192352 A1 * | 8/2007 | Levy | 707/102 |
| 2008/0141180 A1 * | 6/2008 | Reed et al. | 715/854 |
| 2008/0261516 A1 * | 10/2008 | Robinson | 455/3.06 |
| 2009/0024943 A1 * | 1/2009 | Adler et al. | 715/764 |
| 2009/0063414 A1 * | 3/2009 | White et al. | 707/3 |
| 2009/0191531 A1 * | 7/2009 | Saccocci et al. | 434/317 |
| 2009/0222117 A1 * | 9/2009 | Kaplan et al. | 700/94 |
| 2010/0003659 A1 * | 1/2010 | Edmonds | 434/350 |
| 2010/0240416 A1 * | 9/2010 | Knight | 455/566 |
| 2011/0055209 A1 * | 3/2011 | Novac et al. | 707/737 |
| 2011/0153047 A1 * | 6/2011 | Cameron et al. | 700/94 |

* cited by examiner

*Primary Examiner* — Paul McCord (57) ABSTRACT

A system provides music that matches the mood of an e-book when the e-book is read on an e-Reader. The system comprises several sub-components to calculate a user's average reading speed, analyze the e-book for moods, match music to each mood, track music played and purchased, record user's music preference, and play the matched music based on the user's music preference. The moods are indexed as adjectives, adverbs, and onomonopias. A change in mood triggers a change in music played in a wall-to-wall or movie mode. When a user does not have a music preference, the system chooses a default music based on genre, style, and mode based on the analyzed mood. When the system plays music in the movie mode to match a predetermined number of moods, the system fades the music to a pause equal to the predetermined number before resuming the music based on a current mood.

6 Claims, 7 Drawing Sheets

SYSTEM AND METHOD FOR PROVIDING MUSIC BASED ON A MOOD

CROSS-REFERENCE TO RELATED APPLICATION

This application claims the benefit of U.S. Provisional Patent Application No. 61/280, 736, titled "Atmosphere Software Application" filed Nov. 9, 2009, the disclosure of which is hereby expressly incorporated by reference, and the filing date of which is hereby claimed under 35 U.S.C. §119(e).

BACKGROUND

Reading printed material, for example, a book or magazine can be an emotional experience. For example, a romance novel can invoke feelings of joy, happiness or longing. Similarly, a murder mystery can invoke an unsettling feeling of suspense. A movie, unlike printed material can greatly intensify an emotional experience because of its music, especially when the music matches the emotional feeling of a scene. For example, every scene from the movie Jaws may not be remembered by a moviegoer, but hearing a few bars of the theme song can instantly transport the moviegoer back to the terrifying scenes of a shark stalking its human prey. The emotional experience felt by adding music at appropriate times to match the "mood" of a movie scene cannot be duplicated by reading printed material alone. It should be noted that "mood" described herein refers to an emotional feeling experienced while watching a movie or reading printed material. Many readers listen to music while reading. Some readers listen to the music on headphones when they want to block external sounds, especially when reading at a public place. Other readers may choose to listen to music as a way of creating a relaxing reading environment. Currently, readers can listen to the music, for example from a radio station, an Internet source, or a private collection. Since the music played is random, the music rarely matches the mood of the printed material or the duration of the mood, let alone change seamlessly to a next mood, or pause playing altogether as in a movie.

With the advancement in computer technology, it is possible to read printed material in its digital format. Printed material in its digital format includes, but not limited to novels, newspapers, text-books, patent applications, manuals, reports, and the like (collectively, hereinafter "e-books"). E-books can be read on devices, including, but not limited to personal computers, personal digital assistants (PDAs), cellular phones, and dedicated hardware devices known as e-Readers or e-book devices via an e-book application. For example, the digital version of the novel The Da Vinci Code can be read on an iPad via iBooks or the digital version of a TIME magazine can be read on a Kindle via an e-book application of the same name. It should be noted that the two exemplary e-Readers and e-book applications mentioned herein are just two of other current and potentially future e-Readers and e-book applications that are equally within the spirit and scope of the disclosed subject matter.

Presently, even while reading an e-book, the reader has to still rely on listening to the music, for example from the radio station, the Internet source, or the private collection to enhance the reading experience. As mentioned, since the music played is random, the music rarely matches the mood of the e-book or the duration of the mood, let alone change seamlessly to a next mood, or pause playing altogether. An alleged attempt to integrate an e-book with videos from the Internet to enhance the story of the e-book is publicly known. While the attempt alleges to also connect a reader with the author of the e-book and friends of the reader through available social media, the attempt fails to match music to the mood of the e-book, play the music for the duration of the mood, or seamlessly pause or change the music with the mood.

Based on the above-described deficiencies associated with current music delivery systems and methods, or lack thereof, to enhance the reading experience of a user, there is a need for an application that chooses music to seamlessly play to match the mood of an e-book, plays the music for the duration of the mood, and pauses or changes the music with the mood. Since e-books contain more than one mood, which can repeat or change at random, the application is capable of changing the chosen music with a mood and, for example not repeating (or alternately, repeating) a same music for a same mood for the duration of the e-book to enhance different reading experiences based on the user's preference. Further, there also exists a need for a user to purchase the music chosen by the application, or purchase, for example, the theatrical score of a movie based on the e-book.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A system (hereinafter "Atmosphere") and method for providing music based on a mood of an e-book that addresses the deficiencies associated with current music delivery systems and methods is disclosed. In accordance with one exemplary embodiment, when a user turns on an e-book application to read an e-book on an e-Reader such that when the user turns to a first page of the e-book, Atmosphere automatically and without any user input syncs with the e-Reader. In accordance with another exemplary embodiment, Atmosphere comprises several sub-components. These sub-components calculate a user's average reading speed, analyze the e-book for a mood, match music to each mood, track the music played and purchased, record the user's music preference, and play the matched music based on the user's music preference, if any.

In accordance with another exemplary embodiment, moods are indexed as adjectives, adverbs, and onomonopias, i.e., words/sounds, usually in comic books, for example "POW", "BANG", and "KABOOM". In accordance with another exemplary embodiment, in addition to the user's music preference, for example, for playing the music from a particular genre, playing the music either with or without lyrics, playing only the theatrical score from a movie based on the e-book, and playing the author's pick, Atmosphere plays the music in a "wall-to-wall" mode or a "movie" mode. In accordance with another exemplary embodiment, when a user does not have any music preference for the e-book, Atmosphere chooses music based on a default genre, style, and mode based on the analyzed mood. In accordance with another exemplary embodiment, when Atmosphere plays the music in the movie mode that matches a predetermined number of a same mood, Atmosphere fades the music to a pause equal to the predetermined number before resuming the music based on a current mood.

DESCRIPTION OF THE DRAWINGS

The foregoing aspects and many of the attendant advantages of this invention will become more readily appreciated

DETAILED DESCRIPTION

In the following description, numerous specific details are set forth to provide a more thorough description of the illustrative embodiments of the disclosed subject matter. It will be apparent, however, to one skilled in the art that the disclosed subject matter may be practiced without these specific details. In other instances, well known features have not been described in detail so as not to obscure the disclosed subject matter.

In accordance with one exemplary embodiment, Atmosphere comprises several sub-components. These sub-components calculate a user's average reading speed, analyze an e-book for moods, match music to each mood, track music played and purchased, record a user's music preference, and play the matched music based on the user's music preference, if any.

Figure 1:
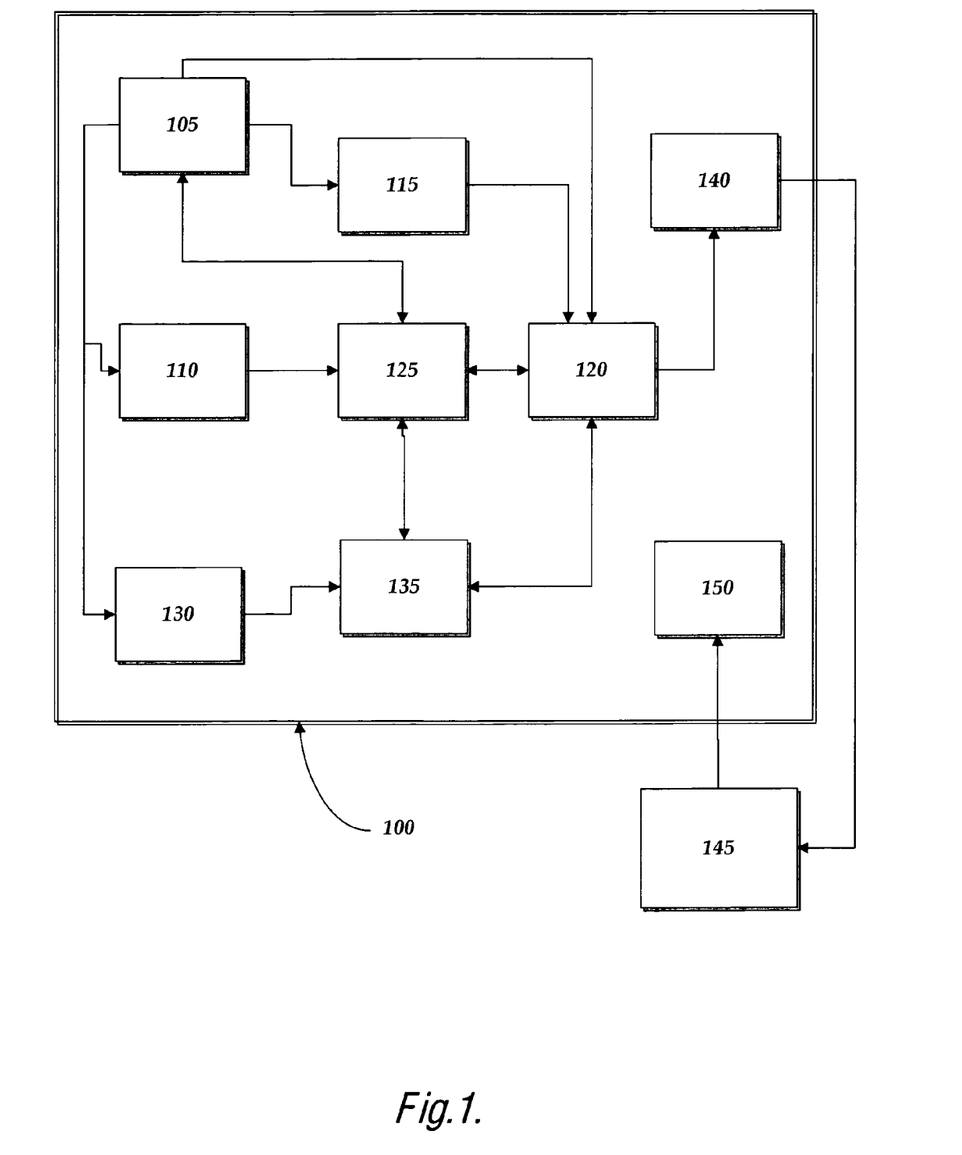
FIG. 1 is a pictorial diagram of Atmosphere comprising several exemplary sub-components.

FIG. 1 is a pictorial diagram of Atmosphere 100 comprising several exemplary sub-components. Sub-component Launch/Close 105 is initialized when Atmosphere 100 syncs with an e-Reader (not shown). Launch/Close 105 interacts with sub-component Preference 110, sub-component Reading Timer (hereinafter "RT") 115, sub-component Reader Enhancement Engine (hereinafter "REE") 120, sub-component Usage Tracker (hereinafter "UT") 125, and sub-component Purchase 130. Launch/Close 105 performs certain house-keeping functions. For example, Launch/Close 105 sends a unique identifier (UID) of the e-Reader and a date/time stamp of when an e-book is first opened to sub-components 110-130. Launch/Close 105 also updates, for example, Preference 110, RT 115, and Purchase 130 when the user closes the e-Reader.

Sub-component Preference 110 keeps track of the user's music preference and transmits the same to UT 125 for further usage. Preference 110 can also search a public or proprietary database for additional preferences associated with the e-book's ISBN and transmits the same to UT 125 for further usage. Sub-component RT 115 calculates the average reading speed of a user and transmits the same to REE 120 for further usage. Sub-component UT 125 keeps a running log of the UID, the e-book's ISBN, date/time stamp, and user's music preference, and transmits the same to REE 120 for further usage.

Sub-component REE 120 interacts with UT 125, sub-component Song Tracker (hereinafter "ST") 135, and sub-component Music Index Database (hereinafter "MID") 140. REE 120 analyzes the text of the e-book received from Launch/Close 105 to select a mood that is transmitted to MID 140 along with other pertinent information received from Preference 110, RT 115, UT 125, and ST 135. MID 140 selects music based on the information sent by REE 120. MID 140 accesses a streaming music provider 145 to stream the music to Player 150, which plays the music to the user via external or built-in speakers or headphones. Streaming music provider 145 can be, for example, a third party music provider such as a radio station, a digital music collection belonging to the user, or a music database on the Internet.

Sub-component Purchase 130 interacts with ST 135 to update a database within ST 135 that logs the music played and purchased by the user. For example, Purchase 130 sends the purchased music's UID, ID3, and date/time stamp to ST 135. Sub-component ST 135 interacts with REE 120 to update music played and purchased in conjunction with the user's music preference information received from UT 125. It should be noted that even though some of the directional arrows are one-way while others are two-way, the directional arrows are only exemplary and can be reversed or interchanged without departing from the spirit of the disclosed subject matter.

In accordance with another exemplary embodiment, when a user turns on an e-book application on an e-Reader to read the e-book, such that when the user turns to a first page of the e-book, Atmosphere automatically and without any user input syncs with the e-Reader. Syncing is required so that certain pertinent information can be exchanged between the e-book application and Atmosphere. For example, the entire text of the e-book is made available to Atmosphere so that Atmosphere can analyze the e-book for moods. Further, for example the time interval between page turns, when the e-book is longer than one page, is made available to Atmosphere so that Atmosphere can calculate the average time it takes the user to read a page in order to correctly play music that matches a mood. Still further, for example, a special dictionary (discussed later) is updated so that only a latest and most comprehensive list of moods is available for analyzing the e-book. The syncing of Atmosphere to the e-Reader is generally known to one skilled in the pertinent arts and will not be discussed.

Figure 2:
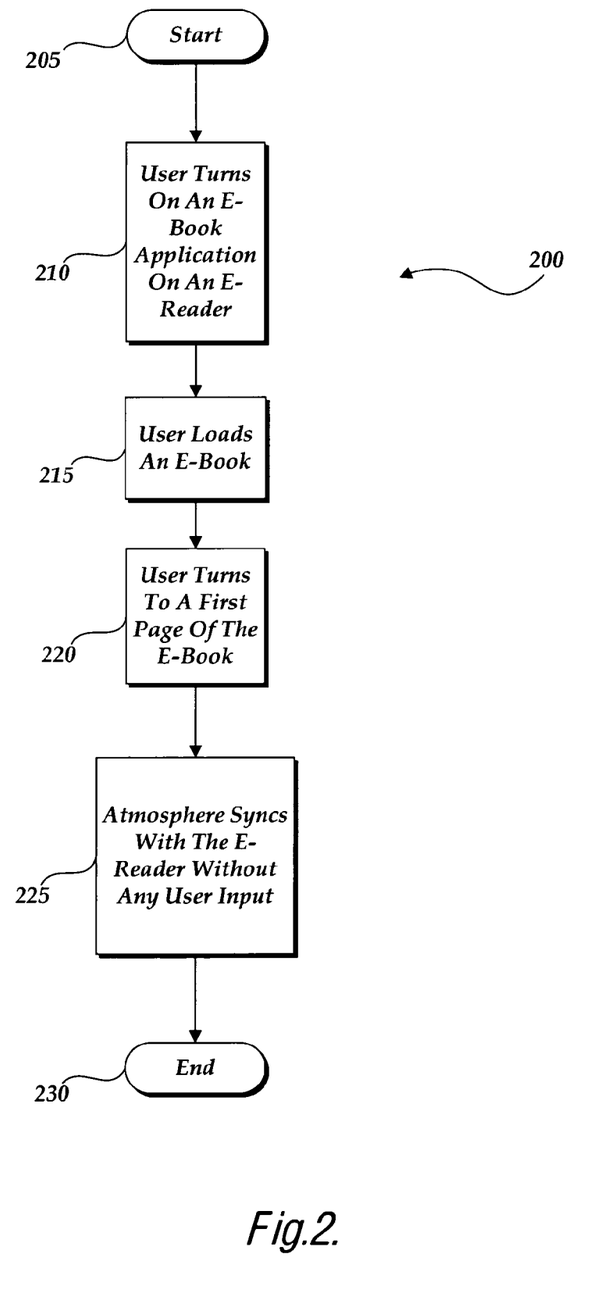
FIG. 2 is a functional flowchart of exemplary iterations for syncing Atmosphere with an e-book application.

FIG. 2 is a functional flowchart 200 of exemplary iterations for syncing Atmosphere with an e-Reader. At step 205, the flow 200 begins and continues to step 210. At step 210, a user turns on an e-book application on the e-Reader. Next, at step 215, the user loads an e-book to read. Next, at step 220, the user turns to a first page of the e-book. Next, at step 225, Atmosphere syncs with the e-Reader without any user input and the flow ends at step 230.

According to one exemplary embodiment, Sub-component Reading Timer or RT calculates a user's average reading speed. According to another exemplary embodiment, after Atmosphere has synced with the e-Reader, the unique identifier (UID) of the e-Reader and the current date/time stamp is sent to the RT. According to another exemplary embodiment, the RT comprises a table where the UID and date/time stamps are recorded. When the user turns the page of the e-book, a new date/time stamp is recorded in the table. With each new date/time stamp, the RT calculates the time between turning pages of the e-book. In other words, the RT calculates the average time it takes the user to read a page of the e-book. For example, when a user starts reading page 1 of an e-book on Jan. 1, 2011 at 10:00:00 PM and turns to page 2 at 10:01:00 PM on the same day, and takes a similar average time turning to subsequent pages, i.e., about one minute, the average reading speed of the user is one minute per page of the e-book. Since the average reading speed of a user depends on the average number of words per page, the average reading speed of the user can vary depending on the average number of words per page. Also, since some words and phrases, and sometimes a plurality of sentences are more difficult to understand, the average reading speed of a user can also vary on the kind and type of e-book. For example, most users would take longer to understand a page written in Shakespearean English than a page of comparable words written in modern U.S. English. According to another exemplary embodiment, when a user takes 200% or more of the calculated average reading speed to turn a page of an e-book, maybe because the user stopped reading but forgot to quit out of the e-Reader, the RT ignores the last date/time stamp so that the calculated average reading speed is maintained. According to another exemplary embodiment, once the RT has calculated the average reading speed of a user for an e-book, usually after averaging time between turning a certain fixed number of pages, the average reading speed for the entire e-book is shared with the sub-component Reader Enhancement Engine or REE.

Figure 3:
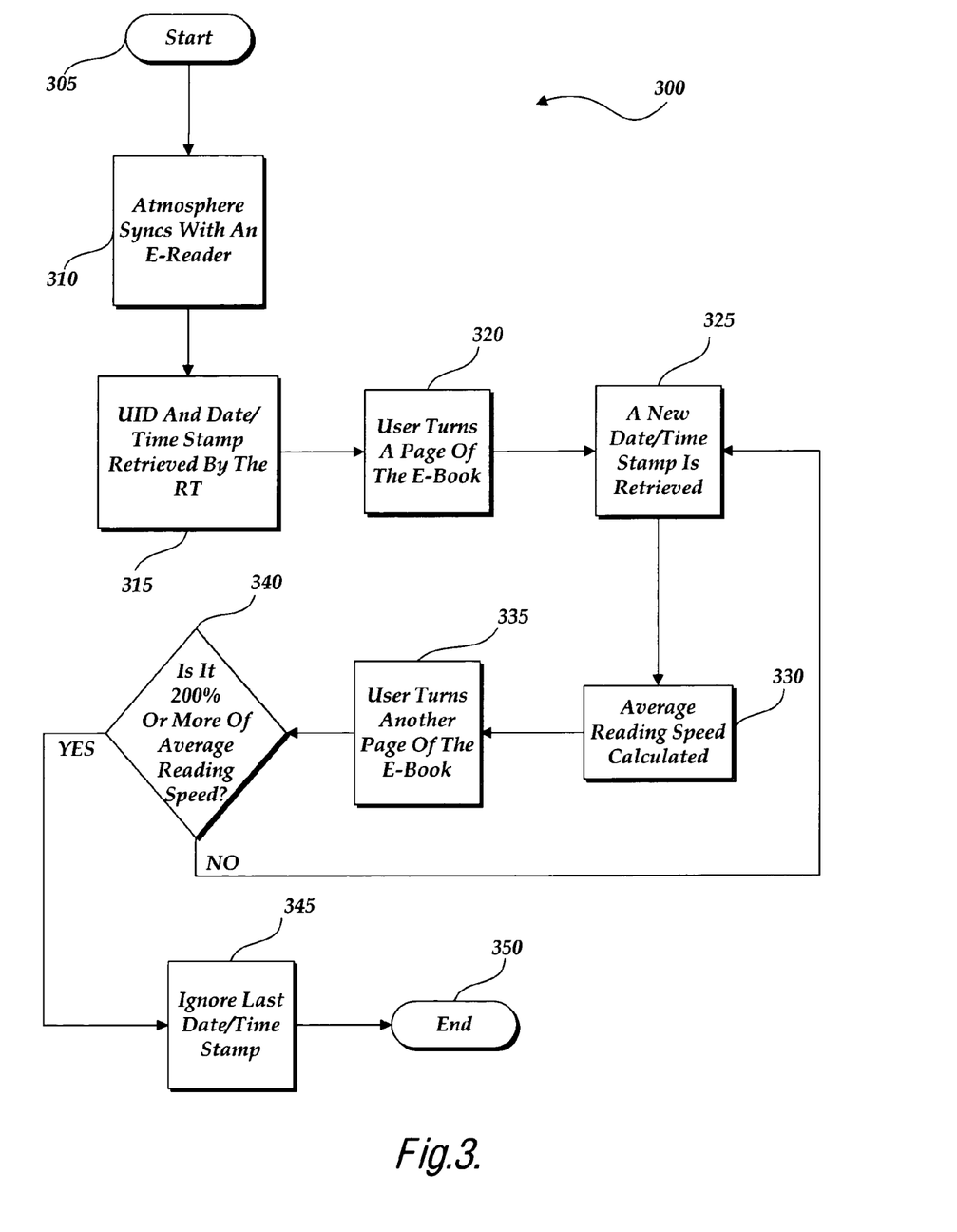
FIG. 3 is a functional flowchart of exemplary iterations for timing a user's average reading speed.

FIG. 3 is a functional flowchart 300 of exemplary iterations for timing a user's average reading speed for an e-book. The flow 300 begins at step 305 and continues to step 310. At step 310, Atmosphere syncs with an e-Reader. Next, at step 315, the UID and date/time stamp is retrieved by the RT from the e-Reader. Next, at step 320, the user turns a page. Next, at step 325, a new date/time stamp is retrieved by the RT from the e-Reader. Next, at step 330, the average reading speed is calculated and shared with the REE. Next, at step 335, the user turns another page. Next, at step 340, a check is made to see if it has taken 200% or more of the calculated average reading speed to turn the page. If, the check is positive (the "YES" arrow from 340), or in other words, it has taken 200% or more of the calculated average reading speed to turn the page, the flow continues to step 345. At step 345, the RT ignores the last date/time stamp and the flow ends at step 350. If on the other hand, the check is negative (the "NO" arrow from 340), or in other words, the user's average reading speed is similar to the average reading speed calculated at step 330, the flow loops back to step 325. It should be noted, that if the user resumes reading the e-book at a later time and if the calculated average reading speed is saved, which usually happens dynamically when the user shuts off the e-Reader, the flow resumes at step 325, else if the calculated average reading speed is not saved, which usually happens when the user forgets to shut off the e-Reader, the flow resumes at step 305.

According to another exemplary embodiment, the sub-component REE analyzes the text of the e-book for moods. As mentioned earlier, moods described herein refer to an emotional feeling experienced while reading an e-book. According to another exemplary embodiment, the REE uses the average reading speed received from the RT in deciding when a particular music must start, change to a different music, or stop playing altogether. The decision to start a particular music, change to a different music, or stop playing the music altogether is determined by the primary mood of a page as determined below. It should be noted that even though one mood per page of the e-book is described herein, the e-book can be divided into sections shorter or longer than one page. Accordingly, there could be more than one mood per page or a mood can extend to more than one page. According to another exemplary embodiment, the REE further transmits the user's music preference (if any) and any additional preferences (if any) received from sub-component Preference and sub-component Usage Tracker or UT to sub-component Music Index Database or MID which selects particular music to play and in which mode, as discussed later, to play the chosen music. According to yet another exemplary embodiment, the REE still further transmits the music purchased by the user and the music received from sub-component Purchase and sub-component Song Tracker or ST in conjunction with the user's music preference (if any) and any additional preferences (if any) to the MID which selects music of a length of time extending, if possible, to the primary mood of the current page being read by the user. When the MID cannot find music long enough to play for the duration of the primary mood, the MID selects more than one music selection. The more than one music selection will play as per the preference information received from the Preference and UT sub-components.

According to one exemplary embodiment, when the REE receives the text of the e-book, the REE invokes a special dictionary to aid in analyzing the text for moods. The special dictionary is a database of all adjectives, adverbs, and onomonopias found in a conventional dictionary. For example, the Merriam-Webster dictionary is used as the conventional dictionary for the English language. Similarly, the Larousse Concise dictionary is used as the conventional dictionary for the French language. It should be noted that even though the disclosed subject matter addresses e-books in the English language, the disclosed subject matter is not limiting to any language. According to one embodiment, the conventional English dictionary is checked for updates after Atmosphere launches. The updates, if any, are transferred to the special dictionary as needed. Accordingly, the special dictionary only contains a most recent and comprehensive list of all adjectives, adverbs, and onomonopias found in the conventional English dictionary. According to another exemplary embodiment, the text of the entire e-book is received by the REE, or depending on the average reading speed of the user, only a portion of the entire text, for example three pages, is received by the REE at a time. The exemplary embodiment where only, for example, three pages are received by the REE at a time, usually happens when Atmosphere can line up the music much faster than the user's average reading speed thus freeing up computing bandwidth while preserving network connectivity.

In accordance with another exemplary embodiment, all words that match the adverbs, adjectives and onomonopias in the special dictionary are extracted from each page of the e-book and indexed into a plurality of moods. For example, the extracted words are indexed into fifteen moods. The fifteen moods are, for example, happy, sad, carefree, dreamy, sleepy, scary, intense, warm, loving, intimate, nostalgic, dark, ominous, creepy, and triumphant. According to another exemplary embodiment, a priority scheme is used to decide the primary mood of a page from the plurality of moods.

According to one embodiment, the priority scheme is based on adjectives only, wherein the primary mood of the page is the adjective encountered a maximum number of times. For example, when there are three happy, one sad, and two triumphant adjectives extracted from a page, happy is chosen as the primary mood of the page. If there is a tie, a tie-breaker rule kicks in wherein the primary mood is chosen from a list of adjectives in a descending order of happy, sad, carefree, dreamy, sleepy, scary, intense, warm, loving, intimate, nostalgic, dark, ominous, creepy, and triumphant. According to another embodiment, the priority scheme is based on adverbs only, wherein the primary mood of the page is the adverb encountered a maximum number of times. If there is a tie, the same tie-breaker rule used for adjectives only is used. According to another embodiment, the priority scheme is based on onomonopias only, wherein the primary mood of the page is the onomonopia encountered a maximum number of times. If there is a tie, the same tie-breaker rule used for adjectives only is used. According to another embodiment, the priority scheme is based on the adjectives outweighing the adverbs, unless an adverb is encountered more times than the adjective encountered a maximum number of times. For example, when there are three happy adjectives and five carefree adverbs extracted from a page, carefree is chosen as the primary mood of the page. According to another embodiment, the priority scheme is based on the onomonopias outweighing the adjectives and the adverbs only when an onomonopia is encountered more times than the adjective or adverb encountered a maximum number of times. For example, when there are five onomonopias, three adjectives, and three adverbs extracted from a page, the mood of the onomonopia within the five onomonopias that is encountered a maximum number of times is chosen as the primary mood of the page.

Figure 4A:
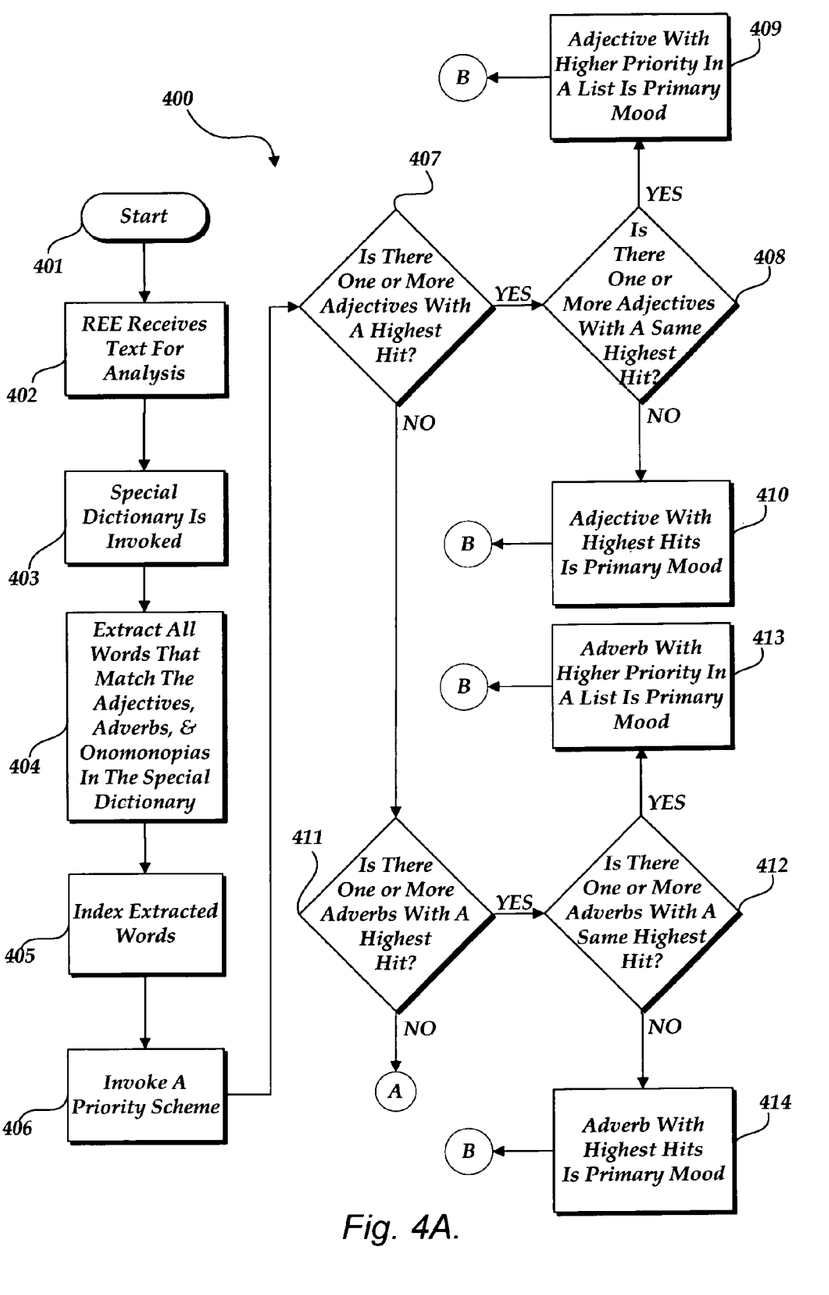
FIG. 4 is a functional flowchart of exemplary iterations for analyzing the text of an e-book for moods.
Figure 4B:
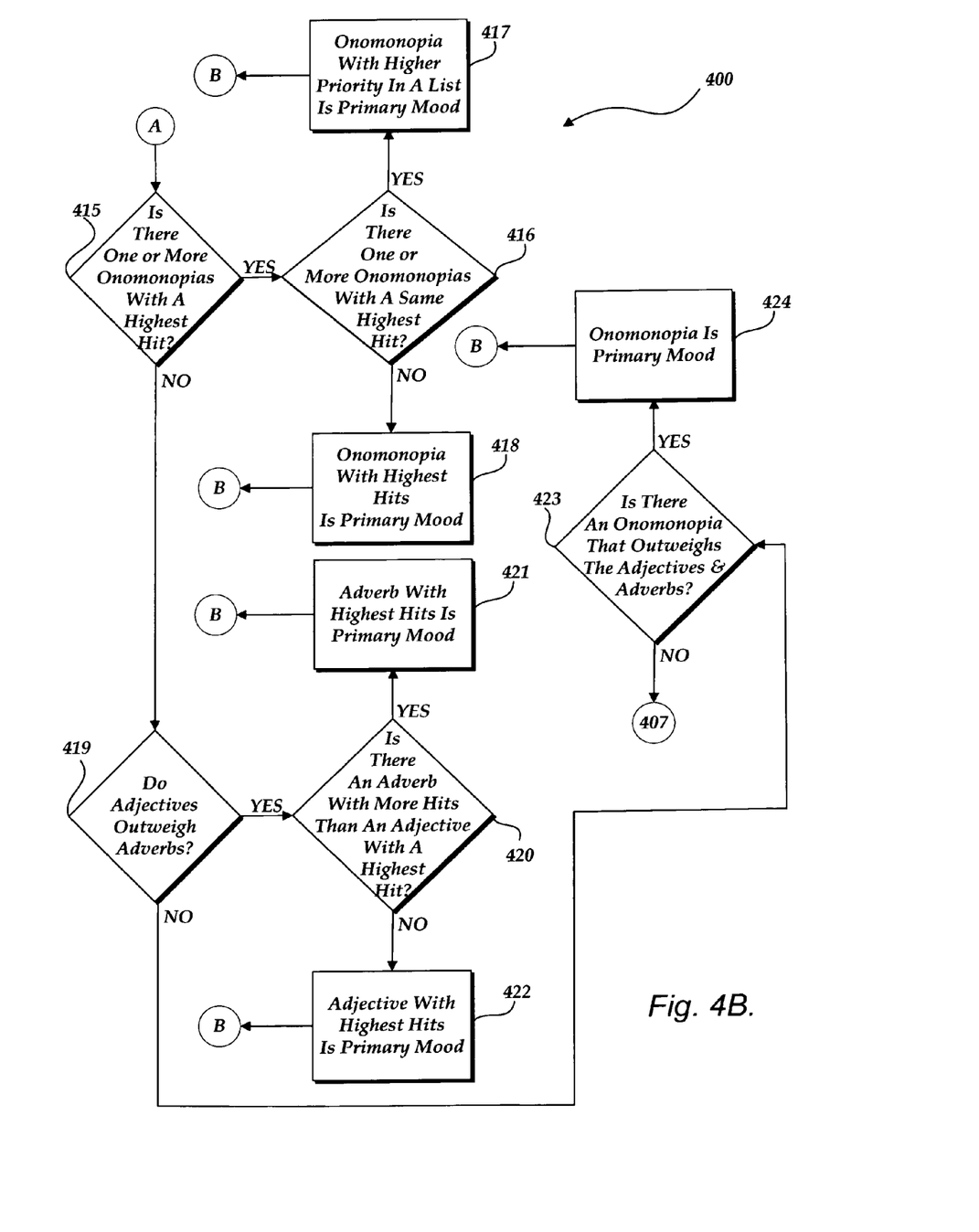
Figure 4C:
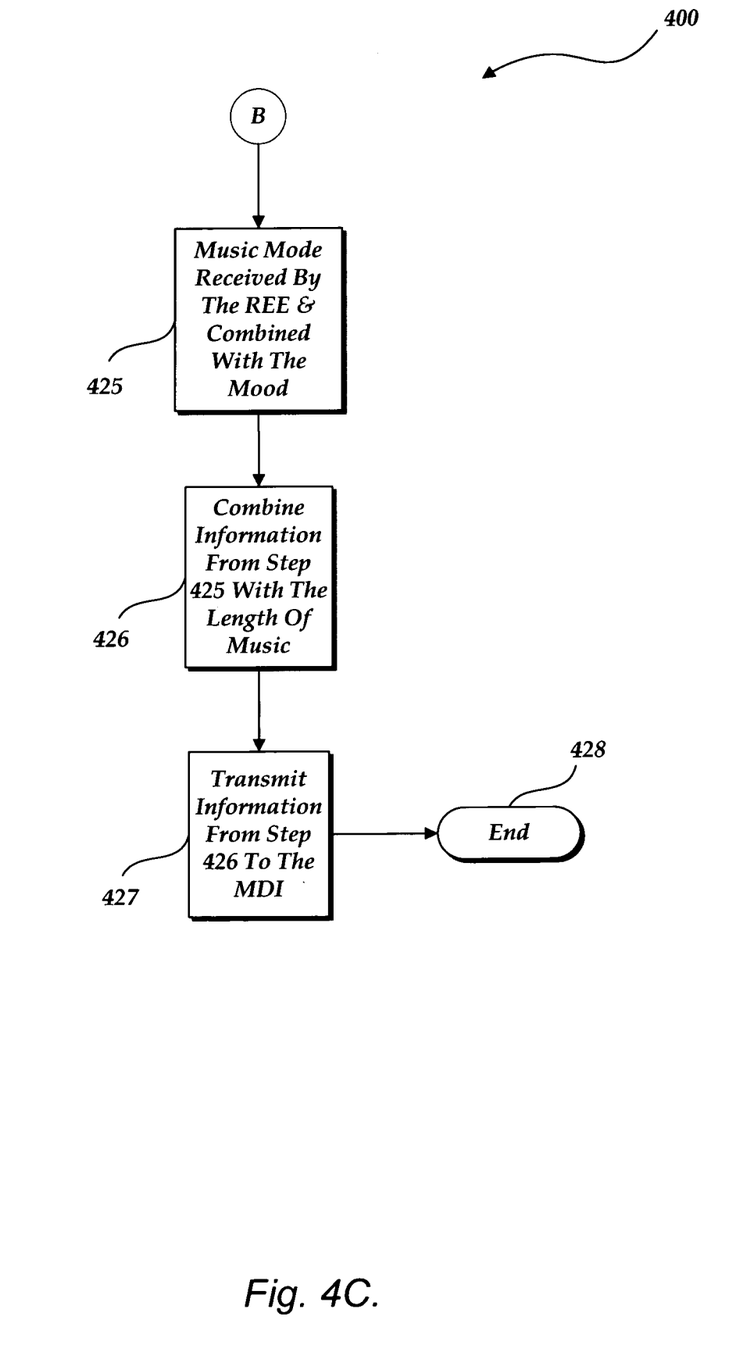

FIG. 4 is a functional flowchart 400 of exemplary iterations for analyzing the text of an e-book for moods. The flow 400 begins at step 401 and continues to step 402. At step 402, the REE receives the text of the e-book for analysis. Next, at step 403, a special dictionary is invoked. As noted, the special dictionary is a database of all adjectives, adverbs, and onomonopias found in a conventional dictionary. Next, at step 404, all words that match the adjectives, adverbs, and onomonopias in the special dictionary are extracted from the received text. Next, at step 405, the extracted words are indexed into a plurality of moods. Next, at step 406, a priority scheme is invoked that will decide the primary mood of each page. Next, at step 407, a check is made to see if there is one or more adjective with a highest hit, i.e. one or more adjectives found a same maximum number of times. If, the check is positive (the "YES" arrow from 407), another check is made at step 408 to see if there is more than one adjective with the same number of highest hits, i.e. a tie-breaker. If, the check at step 408 is positive (the "YES" arrow from 408), the flow continues to step 409 where the adjective with a higher priority in a list of adjectives is chosen as the primary mood and the flow continues to step 425. If, on the other hand, the check at step 408 is negative (the "NO" arrow from 408), the flow continues to step 410 where the adjective with the highest hits is chosen as the primary mood and the flow continues to step 425.

Continuing with FIG. 4, if the check at step 407 is negative (the "NO" arrow from 407), another check is made at step 411 to see if there is one or more adverbs with a highest hit. If, the check is positive (the "YES" arrow from 411), another check is made at step 412 to see if there is more than one adverb with the same number of highest hits, i.e. a tie-breaker. If, the check at step 412 is positive (the "YES" arrow from 412), the flow continues to step 413 where the adverb with a higher priority in a list of adverbs is chosen as the primary mood and the flow continues to step 425. If, on the other hand, the check at step 412 is negative (the "NO" arrow from 412), the flow continues to step 414 where the adverb with the highest hits is chosen as the primary mood and the flow continues to step 425. Continuing with FIG. 4, if the check at step 411 is negative (the "NO" arrow from 411), another check is made at step 415 to see if there is one or more onomonopia with a highest hit. If, the check is positive (the "YES" arrow from 415), another check is made at step 416 to see if there is more than one onomonopias with the same number of highest hits, i.e. a tie-breaker. If, the check at step 416 is positive (the "YES" arrow from 416), the flow continues to step 417 where the onomonopia with a higher priority in a list of onomonopias is chosen as the primary mood and the flow continues to step 425. If, on the other hand, the check at step 416 is negative (the "NO" arrow from 416), the flow continues to step 418 where the onomonopia with the highest hits is chosen as the primary mood and the flow continues to step 425.

Continuing with FIG. 4, if the check at step 415 is negative (the "NO" arrow from 415), another check is made at step 419 to see if the extracted adjectives outweighs the extracted adverbs. If, the check is positive (the "YES" arrow from 419), another check is made at step 420 to see if there is an adverb with more hits than an adjective with the highest hits. If, the check at step 420 is positive (the "YES" arrow from 420), the flow continues to step 421 where the adverb with the highest hits is chosen as the primary mood and the flow continues to step 425. If, on the other hand, the check at step 420 is negative (the "NO" arrow from 420), the flow continues to step 422 where the adjective with the highest hits is chosen as the primary mood and the flow continues to step 425.

Continuing with FIG. 4, if the check at step 419 is negative (the "NO" arrow from 419), another check is made at step 423 to see if an onomonopia outweighs the extracted adjectives and adverbs. If, the check is positive (the "YES" arrow from 423), the flow continues to step 424 where the onomonopia is chosen as the primary mood and the flow continues to step 425. If, on the other hand, the check at step 423 is negative (the "NO" arrow from 423), the flow cycles back to step 407.

In accordance with another exemplary embodiment, once the primary mood of a page is chosen, the REE determines the length of the music to be played. The length of the music depends on the occurrence of the next mood and the user's music preference on the mode of how the music is played. According to one exemplary embodiment, the user can chose between a wall-to-wall mode and a movie mode. In the wall-to-wall mode, the music is continuously played with a music selection dissolving into another music selection. In the movie mode, the music is played as in a movie, i.e. there are sections of the text when there is no music playing or silence and other sections of text when the music plays similar to the wall-to-wall mode. The music in the movie mode usually fades into a silence when the primary mood of a page ends.

Continuing with FIG. 4, at step 425 the music mode is received by the REE from the sub-components Preference and UT and combined with the primary mood selected at steps 409, 410, 413, 414, 417, 418, 421, 422, or 424. Next, at step 426, the length of time music must play for the primary mood is combined with the information at step 425. Next, at step 427, the information at step 426 is transmitted to the MDI and the flow ends at step 428.

In accordance with another exemplary embodiment in the movie mode, when the REE analyzes a continuous sequence of a predetermined number of moods, the REE dictates that the music play for the predetermined number of moods before the music fades to a pause or silences for a length of time equaling the predetermined number before resuming again. For example, when the predetermined number of moods is three, the REE dictates that the sub-component Player plays the music for the three moods before the Player stops playing any music for a length of time equal to the next three moods before resuming the music at the beginning of the next, i.e. fourth mood. The above will be better understood with an example. If a user's average reading speed is one minute per page and the user has listened to three different music selections in succession when the REE analyzes a new mood a minute after the current music has begun playing, the music will fade to a silence after a minute and remain silent for the next three minutes, i.e. the time it takes the user to read three more pages. The music will resume when a mood is analyzed by the REE after the user has read three more pages. The above example is based on the user listening to the music in the movie mode and continuing to read the e-book at the average reading speed calculated by the RT.

According to another exemplary embodiment, once the REE has analyzed a page, a certain fixed number of pages, or the e-book, and has received the pertinent information from the sub-components RT, Preference, UT, and ST, the primary mood is transmitted to the sub-component MID. According to another exemplary embodiment, along with the primary mood, the REE also transmits to the MID the length of time music must play for the primary mood before the start of another music for another primary mood and so on. According to another exemplary embodiment, the REE also transmits to the MID the user's music preference on the mode of how the music is played. According to another exemplary embodiment, the MID selects music based on the information received from the REE. According to another exemplary embodiment, the MID accesses a streaming music provider to stream the selected music to the Player that plays the music to the user via external or built-in speakers or headphones. As discussed, the streaming music provider can be, for example, a third party music provider such as a radio station, a digital music collection belonging to the user, or a music database on the Internet.

Figure 5:
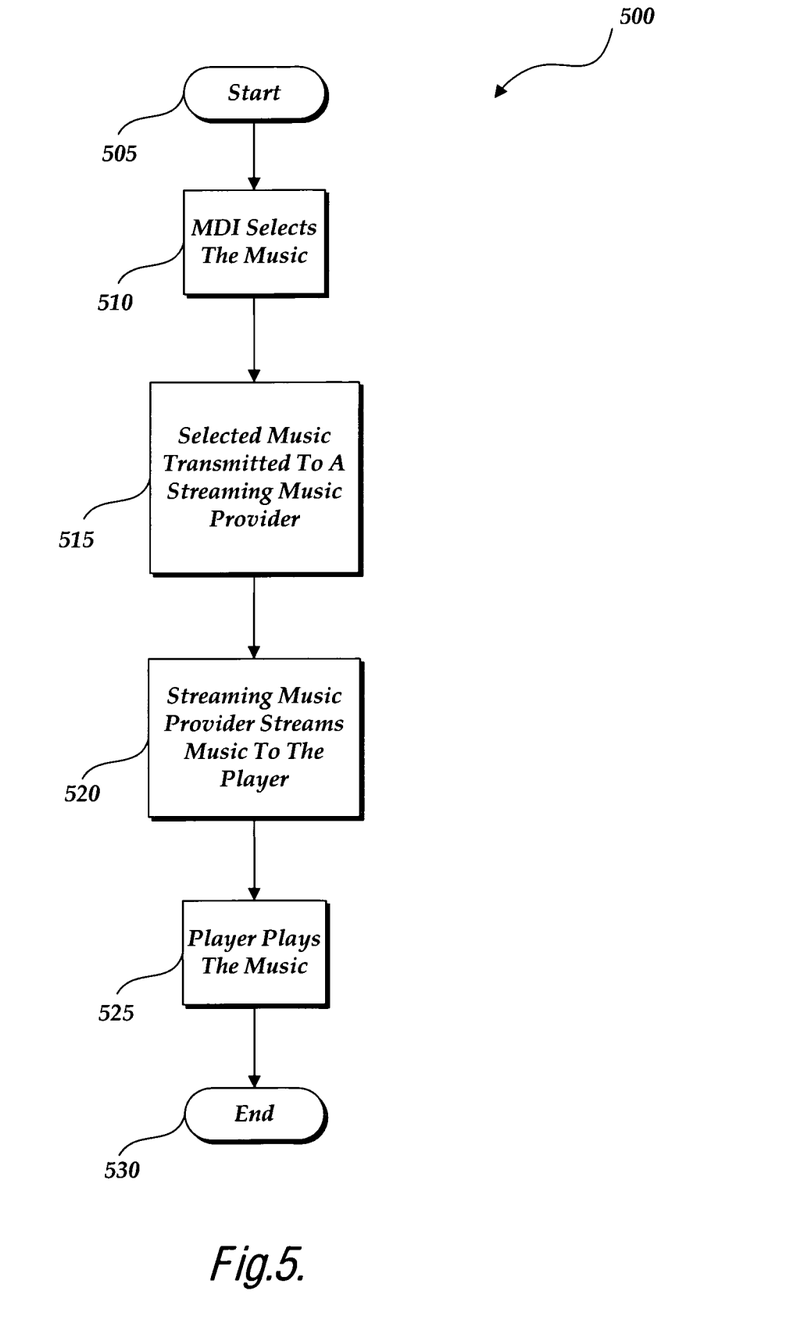
FIG. 5 is a functional flowchart of exemplary iterations for playing music that matches the primary mood and the user's music preference.

FIG. 5 is a functional flowchart 500 of exemplary iterations for playing music that matches the primary mood and the user's music preference. Flow 500 begins at step 505 and continues to step 510. At step 510, the MID selects music that matches the information received from the REE, i.e. primary mood, wall-to-wall or movie mode, and the user's music preference, for example, play music from a particular genre, play music either with or without lyrics, play only an theatrical score from a movie based on the e-book, and play author's pick. Next, at step 515, the selected music is transmitted to a streaming music provider. Next, at step 520, the streaming music provider streams or transmits the music to the sub-component Player. Next, at step 525, the Player plays the streamed music to the user and the flow ends at step 530.

According to another exemplary embodiment, the user can set the user's music preference prior to turning on an e-book application on an e-Reader to read an e-book or at any time thereafter. The user's music preference is initially handled by the sub-component Preference. As noted, a user can set one of two modes to play the music, i.e. wall-to-wall and movie mode. The user can set the mode for the music based on, for example, genre, music either with or without lyrics, only theatrical score from a movie based on the e-book, and author's pick. According to one embodiment, when the user does not have any preference set, Atmosphere defaults to music that matches the primary mood and is a mix of different genres and music either with or without lyrics. According to another embodiment, the sub-component Preference can also search a public or proprietary database for additional preferences associated with the e-book's ISBN. For example, if the author of the e-book listened to certain music while writing the e-book and the author has electronically cataloged the music in the public or proprietary database, i.e., author's pick, the sub-component Preference can retrieve the author's pick for the user. Also, for example, when a teacher has an assignment for students to read an e-book while listening to specific music electronically catalogued in a public or proprietary database, i.e., "teacher's" pick, the sub-component Preference can retrieve the teacher's pick for the students. As noted, the sub-component Preference transmits the user's music and additional preferences to the UT, which stores the information along with a running log of the UID, the e-book's ISBN, and date/time stamp in a database for further usage. For example, since the UT is linked to the sub-component Launch/Close, the user's music and additional preferences can be transmitted to the sub-component Launch/Close to relay to the other sub-components as needed, or directly to the REE for further usage.

According to another exemplary embodiment, the user can purchase the music being played that is selected by the REE based on various factors discussed, i.e. primary mood and user's music and additional preferences. According to another exemplary embodiment, the user can specifically purchase music to be played based on the user's music preference prior to or at any time during reading the current e-book. The user's purchases are initially handled by the sub-component Purchase. As noted, Purchase interacts with the ST to update a database within the ST that logs music played and purchased by the user. According to another embodiment, Purchase transmits the purchased music's UID, ID3, and date/time stamp to the ST. As also noted, since the ST is linked to the REE, a running log of the music played and purchased can be transmitted to the REE to be used in conjunction with the user's music preference information received from the UT.

In accordance with another exemplary embodiment, while the user is reading the e-book, metadata of the music played and purchased is captured and stored in the sub-components ST and UT. For example, the metadata may include information about the date/time and title of the music played or purchased, the title of the e-book and section of text within the e-book where the music was playing, the length of time of the music, and other measurable data.

In accordance with another exemplary embodiment, when the user closes the e-Reader, the UID, the e-book's ISBN, and the date/time stamp data are captured by the sub-component Launch/Close and used to remember the user's setting and music preference. The data can be also used in the future to analyze the user's reading pattern and to make a more accurate choice of the music based on the user's reading pattern in conjunction with the user's music preference.

While illustrative embodiments have been illustrated and described, it will be appreciated that various changes can be made therein without departing from the spirit and scope of the disclosed subject matter. Accordingly, in view of the many possible computing environments to which the principles of the disclosed subject matter may be applied, embodiments described herein are meant to be illustrative and should not be deemed to limit the scope of the disclosed subject matter. Those skilled in the pertinent arts will appreciate the illustrative embodiments disclosed herein may be modified in arrangement and detail without departing from the spirit of the invention. For example, process steps described herein may be interchangeable with other steps in order to achieve the same results and without departing from the spirit and scope of the disclosed subject matter. Further, components shown and described herein may be combined, increased, or decreased in order to achieve the same results, or the functions of the components shown can be performed by other components without departing from the spirit and scope of the disclosed subject matter. Therefore, the disclosed subject matter as described herein contemplates all such embodiments as may come within the scope of the following claims and their full scope of equivalents.

The embodiments of the invention in which an exclusive property or privilege is claimed are defined as follows:

1. A method for providing music based on mood comprising:
   syncing to an e-reader on which an e-book is loaded when a first page of the e-book is displayed on the e-reader, wherein syncing comprises recording a unique identifier of the e-reader;
   analyzing the e-book for moods, wherein primary moods are identified as a user progresses through the e-book, and wherein analyzing the e-book comprises:

invoking a special dictionary in a language of the e-book containing adjectives, adverbs and onomatopoeias found in a conventional dictionary;

extracting words from the e-book that match the adjectives, adverbs and onomatopoeias in the special dictionary;

indexing the extracted words into one of a plurality of moods; and invoking a priority scheme to determine the primary mood of each page;

generating a list of links matching the identified primary moods;

filtering the list of links based on user music preferences; and selecting music based on the identified primary moods in concert with a parameter designating continuous playback or playback comprising timed pauses;

calculating music playback times based on the locations of the primary moods and calculating a user's average reading speed wherein the calculating comprises;

recording a total number of words on the first page of the e-book;

recording a time stamp when the first page of the e-book is displayed on the e-reader;

recording a total number of words on each subsequent page of the e-book;

recording the time stamp when each subsequent page of the e-book is displayed on the e-reader; and logging and updating a user's average turn rate on a server based on the unique identifier and directing primary mood based playback of digital music propagated from a media source.

2. The method of claim 1, wherein the primary moods are selected from the group consisting of a happy mood, a sad mood, a carefree mood, a dreamy mood, a sleepy mood, a scary mood, an intense mood, a loving mood, an intimate mood, a nostalgic mood, an ominous mood, a creepy mood, a regal mood, an adventurous mood, a mysterious mood, a yearning mood, a hopeless mood and a triumphant mood.

3. The method of claim 2, wherein the priority scheme is selected from the group consisting of an adjectives scheme wherein the primary mood of the page is the adjective encountered a maximum number of times on the page and wherein if there is more than one adjective encountered a same maximum number of times the primary mood of the page is the adjective in the more than one adjective with a higher priority, an adverbs only scheme wherein the primary mood of the page is the adverb encountered a maximum number of times on the page and wherein if there is more than one adverb encountered a same maximum number of times the primary mood of the page is the adverb in the more than one adverb with a higher priority, an onomatopoeias only scheme wherein the primary mood of the page is the onomatopoeia encountered a maximum number of times on the page and wherein if there is more than one onomatopoeia encountered a same maximum number of times the primary mood of the page is the onomatopoeia in the more than one onomatopoeia with a higher priority, an adjectives outweighing the adverbs scheme wherein the primary mood of the page is the adjective encountered a maximum number of times on the page unless an adverb is encountered more times than the adjective encountered the maximum number of times, and an onomatopoeias outweighing the adjectives and adverbs scheme wherein the primary mood of the page is the onomatopoeia encountered more times than the adjective or adverb encountered a maximum number of times on the page.

4. The method of claim 1, wherein applying a users music preference comprises:

continuously updating the music playback times as each page of text is displayed on the e-book relative to the average reading speed of the user;

using a priority scheme to determine when to change playback music from the current mood select to a new mood select;

applying a user specified music playback preference such as 'wall-to-wall' (continuous music playback), or 'movie mode' (music playback pauses at timed intervals between music selections to create a 'movie like' experience);

applying a user specified music playback preference such as "lyrics" (only play music with lyrics) or "no lyrics" (only play music without lyrics).

5. The method of claim 4, wherein combining each mood with a user's music preference comprises determining a length of the music to be played for a primary mood and determining a mode of the music, and wherein the length is dictated by the occurrence of a next primary mood and the mode is wall-to-wall mode or movie mode.

6. The method of claim 5, wherein the music played in the wall-to-wall mode or the movie mode is dictated by the user's music preference of music either with or without lyrics, and wherein the user's music preference is set prior to turning on the e-reader or at any time thereafter.

* * * * *